US011750718B2

(12) United States Patent
 Levy Nahum

(10) Patent No.: US 11,750,718 B2
(45) Date of Patent: *Sep. 5, 2023

(54) ACCELERATING DYNAMIC CONTENT DELIVERY IN A CONTENT DELIVERY NETWORK

(71) Applicant: Imperva, Inc., San Mateo, CA (US)

(72) Inventor: David Levy Nahum, Rehovot (IL)

(73) Assignee: Imperva, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/580,268

(22) Filed: Jan. 20, 2022

(65) Prior Publication Data
US 2022/0150321 A1 May 12, 2022

Related U.S. Application Data

(63) Continuation of application No. 16/455,207, filed on Jun. 27, 2019, now Pat. No. 11,240,336.

(51) Int. Cl.
| | |
|---|---|
| *H04L 67/568* | (2022.01) |
| *H04L 67/1001* | (2022.01) |
| *H04L 43/08* | (2022.01) |
| *H04L 67/02* | (2022.01) |
| *H04L 67/141* | (2022.01) |

(Continued)

(52) U.S. Cl.
CPC ............ *H04L 67/568* (2022.05); *H04L 43/08* (2013.01); *H04L 67/02* (2013.01); *H04L 67/1001* (2022.05); *H04L 67/141* (2013.01); *H04L 67/142* (2013.01); *H04L 69/16* (2013.01)

(58) Field of Classification Search
CPC ... H04L 67/568; H04L 67/1001; H04L 43/08; H04L 67/02; H04L 67/141
See application file for complete search history.

(56) References Cited

U.S. PATENT DOCUMENTS 5,696,895 A    12/1997  Hemphill et al.
6,205,498 B1 *  3/2001  Habusha ................. H04L 47/26
                                                          709/228

(Continued)

OTHER PUBLICATIONS

"Crossing a Wide Area Network (WAN) Using HTTP Tunneling for 3d com," downloaded from: http://catiadoc.free.fr/online/basil_C2/basilHTTPTunnel3dcom.htm on Jun. 20, 2019, 11 pages.

(Continued)

*Primary Examiner* — Suraj M Joshi
(74) *Attorney, Agent, or Firm* — Nicholson, De Vos, Webster & Elliott, LLP

(57) ABSTRACT

A technique for accelerating dynamic content delivery in a content delivery network. In some embodiments of the invention, responsive to a request that is sent by a client and that is for dynamic content, a client-proxy hosted in a datacenter of a CDN sends the request to a "forwarder-proxy" hosted in another datacenter of the same CDN. The forwarder-proxy, responsive to the request for dynamic content, forwards the request to an origin server and does not cache the dynamic content. The datacenter selected for the forwarder-proxy is one that is "close" to the origin server in terms of round-trip time (RTT) to improve network performance for requests for dynamic content.

20 Claims, 8 Drawing Sheets

(51) Int. Cl.
   *H04L 67/142*   (2022.01)
   *H04L 69/16*   (2022.01)

(56) References Cited

U.S. PATENT DOCUMENTS

| | | | | |
|---|---|---|---|---|
| 2002/0135794 A1* | 9/2002 | Rodriguez | ......... | H04N 1/00148 358/1.15 |
| 2012/0209942 A1* | 8/2012 | Zehavi | .................... | H04L 67/63 709/213 |
| 2018/0255143 A1* | 9/2018 | Quinlan | .............. | H04L 43/0864 |

OTHER PUBLICATIONS

"Work With Existing On-Premises Proxy Servers," May 20, 2019, downloaded from https://docs.microsoft.com/en-us/zure/active-directory/manage-apps/application-proxy-configure-connectors-with-proxy-servers on Jun. 25, 2019, 7 pages.

Advisory Action, U.S. Appl. No. 16/455,207, dated Mar. 1, 2021, 3 pages.

Apigee Edge, "Chaining API proxies together," downloaded from https://docs.apigee.com/api-platform/fundamentals/connecting-proxies-other-proxies on Jun. 20, 2019, 6 pages.

Boris, et al., "Dynamic Content Acceleration in Imperva CDN Improves Enterprise Website Performance," Imperva, Jan. 9, 2019, downloaded from https://www.imperva.com/blog/dynamic-content-acceleration-in-imperva-cdn-improves-enterprise-website-performance/ on Jun. 20, 2019, 4 pages.

Final Office Action, U.S. Appl. No. 16/455,207, dated Dec. 28, 2020, pp. 1-31.

Imperva, "Dynamic Content Acceleration," Updated Jun. 16, 2019, downloaded from https://docs.imperva.com/bundle/cloud-application-security/page/settings/pop2pop.htm on Jun. 20, 2019, 5 pages.

Imperva, "Improved performance with Dynamic Content Acceleration," Jan. 6, 2019 Release, Updated Jun. 16, 2019, downloaded from https://docs.imperva.com/bundle/cloud-application-security/page/release-notes/2019-01-06.htm on Jun. 20, 2019, 4 pages.

Imperva, "Reverse Proxy," downloaded from https://www.imperva.com/learn/performance/reverse-proxy/?utm_campaign=Incapsula-moved on Jun. 20, 2019, 4 pages.

Non-Final Office Action, U.S. Appl. No. 16/455,207, dated Aug. 5, 2020, 26 pages.

Notice of Allowance, U.S. Appl. No. 16/455,207, dated Sep. 27, 2021, 8 pages.

Van De Erve, "Creating a Forward Proxy Using Application Request Routing," Jun. 10, 2014, downloaded from https://docs.microsoft.com/en-us/iis/extensions/configuring-application-request-routing-arr/creating-a-forward-proxy-using-application-request-routing on Jun. 20, 2019, 11 pages.

* cited by examiner

For each of a plurality of the requests for dynamic content sent from different client-proxies in different ones of a first plurality of CDN proxies of the CDN responsive to different ones the HTTP requests sent from different ones of the plurality of user electronic devices to the different client proxies
400

Select one of a third plurality of datacenters as a currently selected datacenter based on the destination of the request for dynamic content, wherein different ones of the plurality of origin servers are executing on electronic devices in different ones of the third plurality of datacenters
402

Selecting as a currently selected origin server one from a set of one or more the plurality of origin servers in the currently selected datacenter based on configuration information
404

Send sending the request for dynamic content to the currently selected origin server
406

FIG. 4A

ACCELERATING DYNAMIC CONTENT DELIVERY IN A CONTENT DELIVERY NETWORK

CROSS-REFERENCE TO RELATED APPLICATIONS

This application is a continuation of application Ser. No. 16/455,207 filed Jun. 27, 2019 (now U.S. Pat. No. 11,240,336), which is hereby incorporated by reference.

TECHNICAL FIELD

Embodiments of the invention relate to the field of networking; and more specifically, to content delivery networks.

BACKGROUND ART

Content delivery networks (CDNs) (also known as content distribution networks) include a number of CDN proxies (also known as CDN servers) strategically placed geographically (typically within different datacenters, which are buildings used to house electronic devices and associated components) with the primary purpose of accelerating the delivery of static web content from origin servers (also referred to as the customer origin, web servers, API servers, backend servers, or target servers—the primary source/host of a website's data/files) to user electronic devices. CDN proxies include or can operate as client-proxies (also called "edge proxies," "edges", "edge nodes," "on-CDN proxies," or "edge networks") that are the closest edge of CDN assets to the user electronic device(s). A point of presence (POP) refers to a physical location (typically a datacenter) where one or more edge proxies are located. A given CDN proxy can operate in a number of roles, including: 1) a reverse-proxy (an intermediary server between an user electronic device and the origin server that forwards HTTP requests to the origin server and that forwards HTTP responses back to the user electronic device); 2) a caching server (also referred to as a reverse-proxy that caches) (e.g., NGINX, VARNISH) that are used to cache static (and some dynamic) content retrieved from an origin server; and/or 3) an application delivery controller (e.g., aiScalar).

In one existing CDN, configuration information (also known as datacenter configuration information) is stored in each datacenter within the CDN (more specifically, within each entity of the CDN—such as the client-proxies, the L2 caches, etc.). Depending on the entity, this configuration information includes the internet protocol (IP) address(es) of the origin server(s), load balancing algorithms, etc.

Typically, a client executing on a user electronic device sends a domain name service (DNS) request with a fully qualified domain name (e.g., a.com). Responsive to the DNS request, a DNS server looks up the corresponding CNAME record. The CNAME record includes a domain name of the CDN. The domain name of the CDN is resolved to one of the CDN's public ANYCAST IP addresses. For example, the chosen ANYCAST IP address is the one assigned to the closest (e.g., by geographic location) CDN datacenter with a CDN proxy. This is sent to the client as a DNS response. Upon receiving the DNS response, the client sends an HTTP request to the CDN proxy (operating as a client-proxy—that is, as a reverse-proxy and a caching server). For static content, the content may be provided using various techniques (e.g., if the CDN proxy has the content cached, the CDN proxy may send the content to the client; if not, the CDN proxy may request the content from a level 2 (L2) cache in the same datacenter; if it is not in the L2 cache, the L2 cache may requests it from an origin server). In contrast, for dynamic content, the CDN proxy uses a TCP connection (opening one if one is not already opened) to the origin server to access the dynamic content. For example, if a client running on a user electronic device sends an HTTP request to a first client-proxy in a first datacenter and the configuration information indicates use of a first origin server in a second datacenter, then for dynamic content a dynamic routing occurs on a lower routing level to establish a TCP connection between the first client-proxy (e.g., and thus the CDN proxy operating as the first client-proxy and the first datacenter in which the first client-proxy is located) and the first origin server (e.g., thus the second datacenter).

BRIEF DESCRIPTION OF THE DRAWINGS

The invention may best be understood by referring to the following description and accompanying drawings that are used to illustrate embodiments of the invention. In the drawings:

FIG. 4A is a flow diagram for a forwarder-proxy according to some embodiments of the invention.

DETAILED DESCRIPTION

Figure 1:
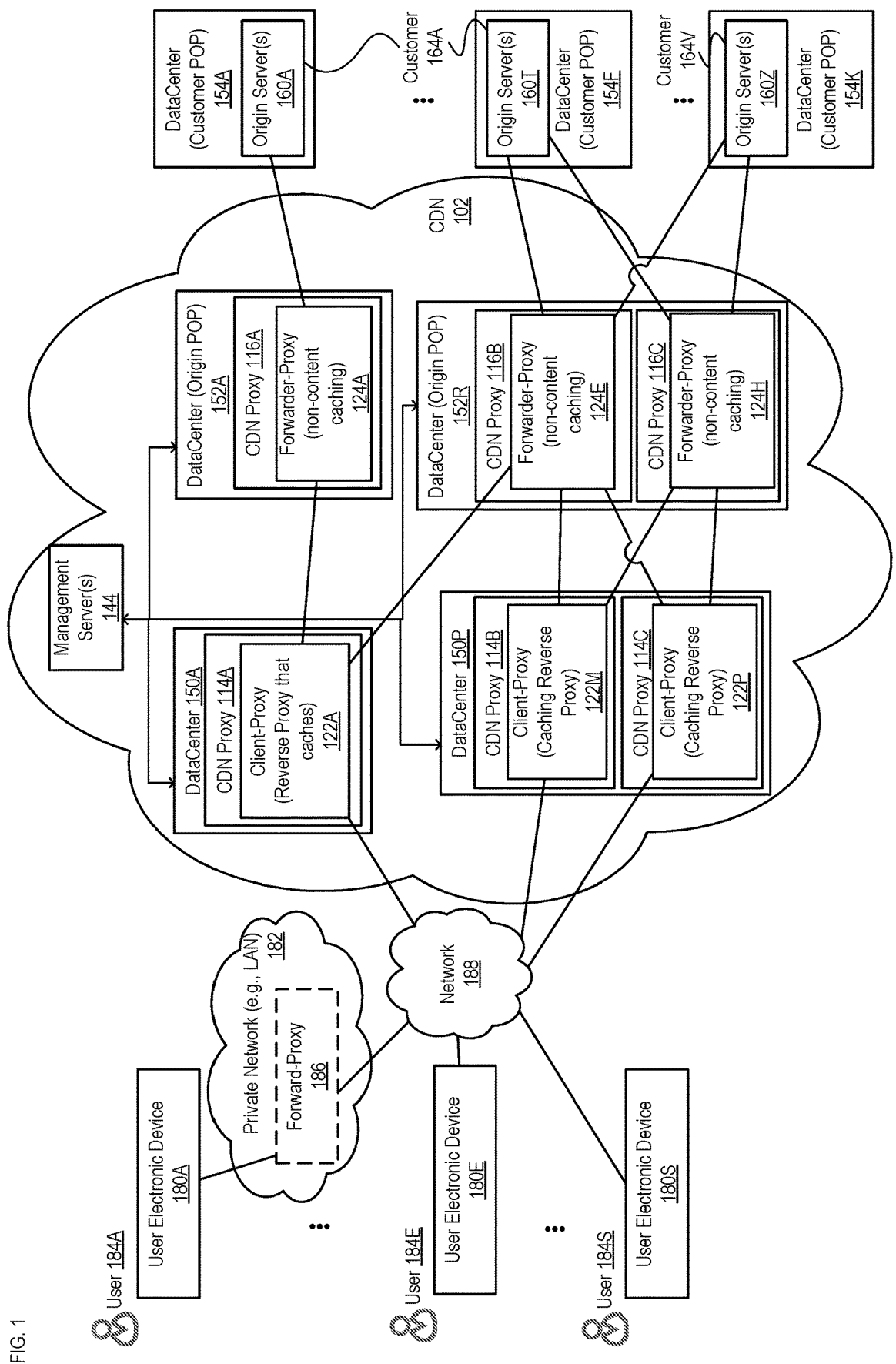
FIG. 1 is a block diagram illustrating the use for forwarder-proxies according to some embodiments of the invention.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Overview

In some embodiments of the invention, a client on an electronic device connects to a client-proxy hosted in a POP of a CDN, which for dynamic content connects to a "forwarder-proxy" hosted in another POP (sometimes referred to as the "origin pop" or "forwarder POP") of the same CDN. The forwarder-proxy does not cache web traffic. The one of the POPs within the CDN selected for the forwarder-proxy is one that is "close" to the origin server in terms of round-trip time (RTT). Round-trip time (RTT) is the number of milliseconds (ms) it takes to open a connection (e.g., a TCP connection) between two endpoints. RTT is not influenced by file size or the speed of Internet connection, but by physical distance, number of network hops, amount of traffic, and transmission mediums. This selection of the one of the POPs within the CDN from the forwarder-proxy is to improve network performance for requests for dynamic content.

As compared to conventional techniques that do not use forwarder-proxies, some embodiments that use forwarder-proxies have improved performance, such as reducing time delay, improving the quality of the TCP connections, and reducing the number of IP addresses used to reach the origin server (for dynamic content, the IP addresses used to reach the origin server will be of the forwarder-proxy(s)). These performance improvements become more pronounced when a client is attempting to connect to an origin server that is "far away" (e.g., geographically).

While in some embodiments the RTT is measured in terms of layer 3/4 performance by measuring the time it takes to open a TCP connection (not sending a request), alternative embodiments use other techniques and/or do so at other layers (e.g., measuring RTT in terms of layer 3/4 performance by measuring SYN—SYN/ACK time; measuring RTT in terms of layer 7 performance by measuring the time to first byte which also measures server application side timing).

FIG. 1 is a block diagram illustrating the use for forwarder-proxies according to some embodiments of the invention. In FIG. 1, a CDN 102 includes several CDN proxies in several different datacenters. More specifically, the CDN proxies 114A and 114B-C are respectively hosted in datacenters 150A and 150P and are respectively operating as client-proxies 122A, 122M, and 122P; while the CDN proxies 116A and 166B-C are respectively hosted in datacenters 152A and 152R and are respectively operating as forwarder-proxies 124A, 124E, and 124H. While FIG. 1 illustrates the CDN proxies with different references and as operating as either client-proxies or forwarder-proxies, embodiments are not so limited (e.g., one or more of the CDN proxies may operate in multiple roles, including client-proxy, forwarder-proxy, L2 cache; in fact, in some embodiments the same code base is used in each of the CDN proxies).

While in the CDN 102 in FIG. 1 includes a set of one or more management servers 144 coupled to manage the CDN proxies, alternative embodiments may use a different approach (e.g., election of one or more of the CDN proxies to operate as the management server(s); as opposed to the centralized approach of the managements server(s) 144, a distributed approach to the operations of the management server(s)).

In FIG. 1, the CDN 102, responsive to HTTP requests sent from user electronic devices 180A-S (which may be operated by users 184A-S) and having as destinations different ones of a number of websites hosted by various origin servers 160A-Z, accelerates delivery of content originating from the origin servers 160A-Z operated on behalf of customers 164A-V of the CDN 102. Various datacenters 154A-K host the origin servers 160A-Z. In the specific example of FIG. 1, the set of one or more origin servers 160A and the set of one or more origin servers 160T are operated on behalf of a customer 164A and are respectively hosted in the datacenter 154A and the datacenter 154F; while the set of one or more origin servers 160Z are operated on behalf of a customer 164V and are hosted in the datacenter 154K.

FIG. 1 also illustrates that the user electronic devices may be connecting to the client-proxies via a network 188, and possibly also through a private network (e.g., a local area network (LAN)) 182 that includes a "forward-proxy 186." In contrast to a forwarder-proxy that is part of the CDN, a forward-proxy 186 is part of the private network 182 and regulates outbound traffic according to present policies.

The client-proxies 122A-P receive the HTTP requests, separate the HTTP requests into requests for dynamic content and requests for non-dynamic (also referred to as static) content, operate as reverse proxies that cache with regard to the requests for non-dynamic content, and send different ones of a plurality of the requests for dynamic content to different ones of the forwarder-proxies 124A-H based on the destinations of the requests and according to a mapping (not shown) between the datacenters 152A-R and the datacenters 154A-K for different ones of the customers 164A-V based on a measure of the round-trip time (RTT) between different ones of the datacenters 152A-R and different ones of the datacenters 154A-J.

Responsive to the plurality of requests for dynamic content, the forwarder-proxies 124A-H forward the requests for dynamic content to different ones of the plurality of origin servers 160A-Z based on configuration information.

In some embodiments, there are situations when a forwarder-proxy will not be used for some of the requests for dynamic content (e.g., forwarder-proxies are not configured for the customer and/or the site, forwarder-proxies are globally disabled, there is not a forwarder-proxy available that will improve performance), the client-proxies send those requests for dynamic content to the appropriate ones of the origin servers. Thus, in some embodiments, a given client-proxy may send some of the requests for dynamic content to one or more of the forwarder-proxies and send others of the request for dynamic content to one or more of the origin servers.

FIG. 1 illustrates the client-proxies 122A-P and the forwarder-proxies 124A-H as respectively near the user electronic device 180A-S and the origin servers 160A-Z to reflect that the datacenters for the client-proxies and the forwarder-proxies are chosen based on "closeness" to the user electronic device 180A-S and the origin servers 160A-Z. With regard to the forwarder-proxies 124A-H, the datacenters for the forwarder-proxies 124A-H for different ones of the datacenters 154A-K are chosen based on the above discussed RTT.

Different embodiments may store the mapping in the CDN 102 in different entities. For instance, the same full mapping may be stored in each of the CDN proxies, subsets of the full mapping may be stored in different ones of the CDN proxies such that each of the CDNs has just the information they need, the full mapping may be stored in the management server(s) 144 (which are queried by the CDN proxies), etc.

Additionally, different embodiments may store the content of the mapping in different ways. For example, some embodiments store the mapping in each of the CDN proxies of the CDN as configuration information, where the configuration information includes: 1) global configuration information (e.g., information identifying each of the CDN datacenters and each of the CDN proxies in those datacenters, as well as optionally global enables (e.g., for the CDN datacenters, the client-proxies, and/or the forwarder-proxies), global thresholds (e.g., server limits, connection limits, etc.), security rules, security definitions, an indication of a load balancing algorithm to use toward the forwarder-proxies); and 2) site configuration information (also referred to as customer information and customer configuration information) that identify, for each of the CDN's customers, which of the CDN datacenters to use for the requests for dynamic content (and thus, in which datacenter to find a forwarder-proxy), sites (e.g., origin IP addresses), and an indication of a load balancing algorithm to use toward the origin servers, as well as optionally control to configure which features of the CDN to use). In some such embodiments, responsive to an HTTP request sent to the client-proxy 122A for dynamic content provided by a site of the customer 164V hosted by the set of origin servers 160Z, the client-proxy 122A: 1) accesses the site configuration information to determine which of the CDN datacenters to send the request for dynamic content; 2) accesses the global configuration information to determine what forwarder-proxies are available in that CDN datacenter; 3) applies load balancing to select one if there is more than one; and 4) sends the request for dynamic content to the selected forwarder-proxy. As indicated above, while some embodiments will be described which store the configuration information in each of the CDN proxies and in the way discussed above, alternative embodiments may use more, less, and/or different configuration information and/or distribute it differently (e.g., the site configuration may only identify the CDN datacenter to use for dynamic content, and the client-proxy must request the list of forwarder-proxies from that CDN datacenter).

Different embodiments may implement the client-proxies 122A-P differently in terms of their operation as reverse proxies that cache with regard to the requests for non-dynamic content. For instance, the caching in the client-proxy that receives the HTTP request from the user electronic device may be a level 1 (L1) cache, which provides the content from its cache or sends the request based on whether the request hits or misses the cache. In some embodiments, when the client-proxy sends the request on, it sends it to zero or more other levels of CDN cache (e.g., other client-proxies in the same datacenter, other CDN proxies in other datacenters). If there is a miss in all of the CDN's cache levels, the request is sent to an origin server.

In some embodiments, there may be more than one CDN proxy per CDN datacenter; thus, there may be more than one client-proxy and/or more than one forwarder-proxy per CDN datacenter (e.g., see datacenters 150P and 152R). Where there is more than one forwarder-proxy per datacenter, a client-proxy may apply a load balancing algorithm to distribute the request for dynamic content between the multiple forwarder-proxies.

By way of examples: 1) the user electronic device 180A may send HTTP requests having as a destination a site of the customer 164A to the client-proxy 122A, which may send those of the requests for dynamic content to the forwarder-proxy 124A, which may forward them to the origin servers 160A (which may send HTTP responses back the same way); 2) the user electronic device 180A may send HTTP requests having as a destination a site of the customer 164V to the client-proxy 122A, which may send those of the requests for dynamic content to the forwarder-proxy 124E, which may forward them to the origin servers 160Z (which may send HTTP responses back the same way); 3) the user electronic device 180E may send HTTP requests having as the destination the site of the customer 164A to the client-proxy 122M, which may send (based on load balancing) different ones of those of the requests for dynamic content to different ones of the forwarder-proxies 124E and 124H, which may forward them to the origin servers 160T (which may send HTTP responses back the same way); 4) the user electronic device 180S may send HTTP requests having as the destination the site of the customer 164V to the client-proxy 122P, which may send (based on load balancing) different ones of those of the requests for dynamic content to different ones of the forwarder-proxies 124E and 124H, which may forward them to the origin servers 160Z (which may send HTTP responses back the same way).

Thus, when considering where to establish CDN datacenters, the operator of a CDN using this forwarder-proxy approach would consider both being near to user electronic devices and near customer datacenters. In other words, the operator may work to extend the CDN such that it is both near the expected user electronic devices and the expected origin servers so that requests for dynamic content can be sent across the CDN on connections between client-proxies and forwarder-proxies. For a given customer datacenter with origin server(s), the TCP connections between the CDN network and the origin servers are established to ensure that origin servers are connected to the CDN network with the best connection available. That is, of the CDN datacenters, the one "nearest" the customer's datacenter (and thus, the origin server therein) is selected to host the forwarder-proxies that will establish TCP connections with the origins servers). Since these TCP connections will be good, the client-proxies in the other CDN datacenters can communicate with the forwarder-proxies in the selected datacenter to accelerate traffic. By way of example, this is in contrast to a conventional CDN that, for dynamic content, opens a TCP connection between the client-proxy and an origin server, and thus relies on border gateway protocol (BGP) performance.

While in some embodiments the connections between the various client-proxies and forwarder-proxies are established on demand (responsive to a first request for content requiring a given connection), other embodiments establish them ahead of time. Similarly, while some embodiments establish the connections between the various forwarder-proxies and origin servers on demand (responsive to a first request for content requiring a given connection), other embodiments establish them ahead of time. By way of specific example, a given forwarder-proxy may establish its first TCP connection to an origin server on demand, but while doing so it also establishes additional TCP connections to the origin server but without sending requests on those TCP connections. These additional TCP connections remain valid connections, and they are used when needed. As a result, when a TCP connection is needed, one from the pool can be used rather than incurring the delay to establish one from scratch.

Once a TCP connection is established between a given client-proxy and a given forwarder-proxy, it may be kept open so that it may carry requests for dynamic content from user electronic devices and responses thereto across the CDN. As a result, these TCP connections will be optimal in their TCP congestion window (TCP CWND) and slow start, as compared to a client-proxy opening TCP connections to origin servers (particularly ones that are far away), because of the handshaking overhead to open a TCP connection, congestion control in TCP protocol (which requires a gradual process of increasing the amount of traffic sent), etc.

Establishing and Monitoring a Mapping

Figure 2:
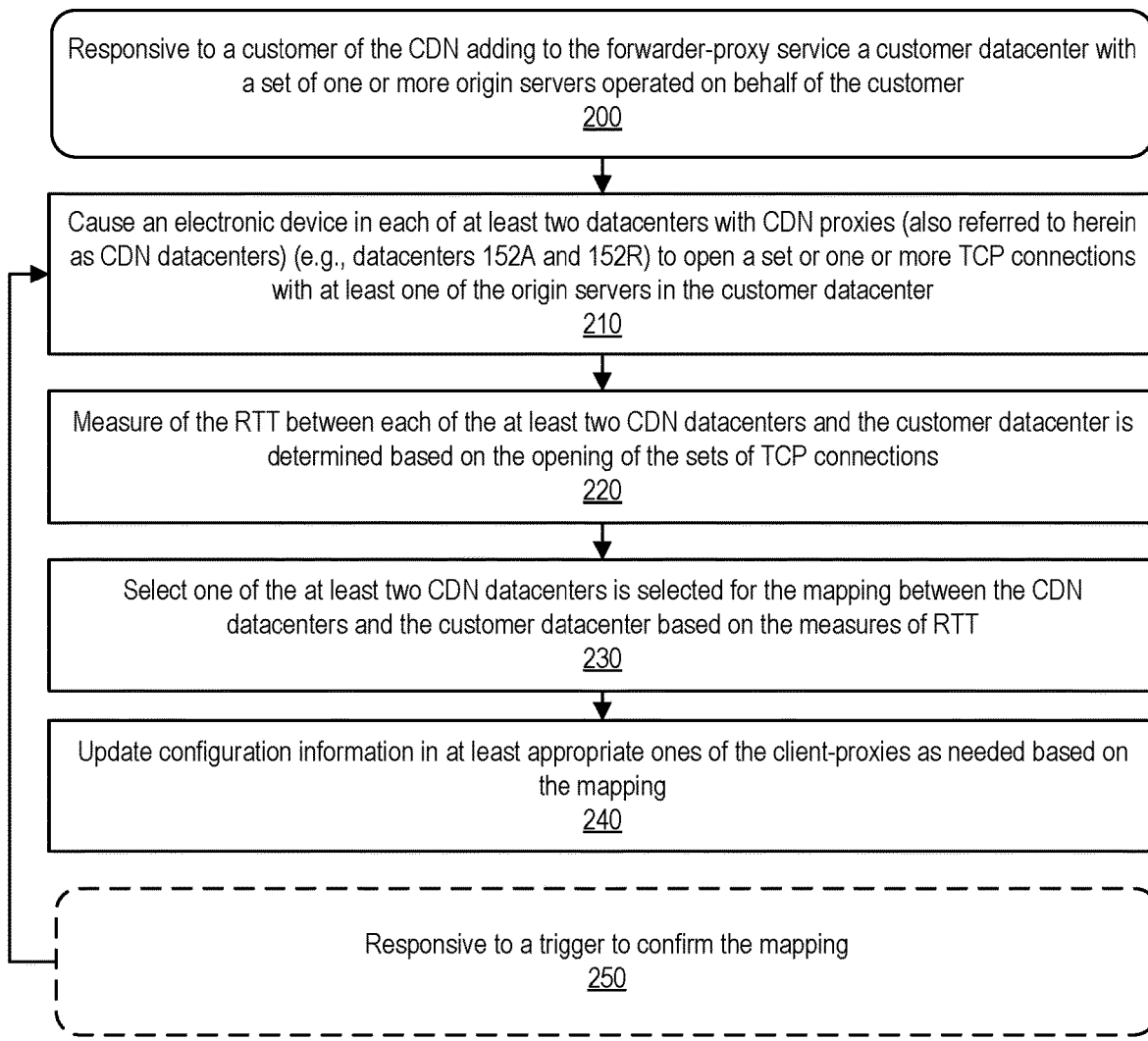
FIG. 2 is a flow diagram for establishing and monitoring a mapping according to some embodiments of the invention.

FIG. 2 is a flow diagram for establishing and monitoring a mapping according to some embodiments of the invention. Responsive to a customer (e.g., customer 164V) of the CDN adding to the forwarder-proxy service a customer datacenter (e.g., datacenter 154K) with a set of one or more origin servers (e.g., origin server(s) 160Z) operated on behalf of the customer (block 200), in block 210 an electronic device in each of at least two datacenters with CDN proxies (also referred to herein as CDN datacenters) (e.g., datacenters 152A and 152R) is caused to open a set or one or more TCP connections with at least one of the origin servers in the customer datacenter (e.g., datacenter 154K). In some embodiments that employ the management server(s) 144, one or more of the management server(s) 144 responds to input regarding the customer's datacenter and origin servers by sending an instruction to the electronic devices. While in some embodiments each of the sets of TCP connections includes 3 TCP connection, alternative embodiments may use more or less.

In block 220, a measure of the RTT between each of the at least two CDN datacenters and the customer datacenter is determined based on the opening of the sets of TCP connections. In embodiments in which a given one of the electronic devices opens multiple TCP connections as part of the set of the TCP connection, the measure of the RTT is based combining the results of opening the set of TCP connection (e.g., an average). While in some embodiments, which use the management server(s) 144, the electronic devices determine and send the measures to the management server(s) 144; in other embodiments the electronic devices send raw data to the management server(s) 144 which determine the measures.

In block 230, one of the at least two CDN datacenters is selected for the mapping between the CDN datacenters and the customer datacenter based on the measures of RTT. In some embodiments, the CDN datacenter with the lowest measure of RTT is selected because it is expected to provide the best performance. In embodiments that use the management server(s) 144, one of the management server(s) 144 selects one of the CDN datacenters (e.g., selects, from the datacenters 152A and 152R, datacenter 152R) to host a set of one or more forwarder-proxies (e.g., the forwarder-proxies 124E and 124H) for the customer datacenter (e.g., datacenter 154K) based on the measures of RTT. While in some embodiments there is only one CDN datacenter selected for the mapping to the customer datacenter, other embodiments select one or more additional CDN datacenters (e.g., as backups).

In block 240, configuration information in at least appropriate ones of the client-proxies is updated as needed based on the mapping. For example, configuration information in each of the client-proxies (e.g., client-proxies 122A-P) is updated to reflect that requests for dynamic content in the origin server(s) of the customer may be sent to the forwarder-proxies in the selected CDN datacenter (e.g., either of the forwarder-proxies 124E and 124H in the CDN datacenter 152R). The phrase "as needed" is used because the first time this flow is performed for a customer datacenter and updated will be performed, but the updating need not be performed if there is not a change responsive to the below discussed repetition of this flow. While in some embodiments the configuration information is only updated in those of the CDN proxies that need to be aware of it, in alternative embodiments the configuration information is updated in all the CDN proxies. In embodiments which use the above discussed site configuration information, the site configuration information for the customer (e.g., the customer 164V) would be updated. In embodiments that use the management server(s) 144, the management server(s) 144 send instructions to at least the client-proxies to update their configuration information.

Responsive to a trigger to confirm the mapping (optional block 250), control passes to block 210. Different embodiments may support different triggers (e.g., a timer (such as weekly), administrator input, customer input). As described above, some embodiment chose a single electronic device in each datacenter to measure the RTT. This, along with a time-based trigger, is done in some embodiments to limit the amount of traffic being sent between the forwarder-proxies and the origin servers for the purpose of measuring RTT.

Processing HTTP Requests by a Client-Proxy

Figure 3A:
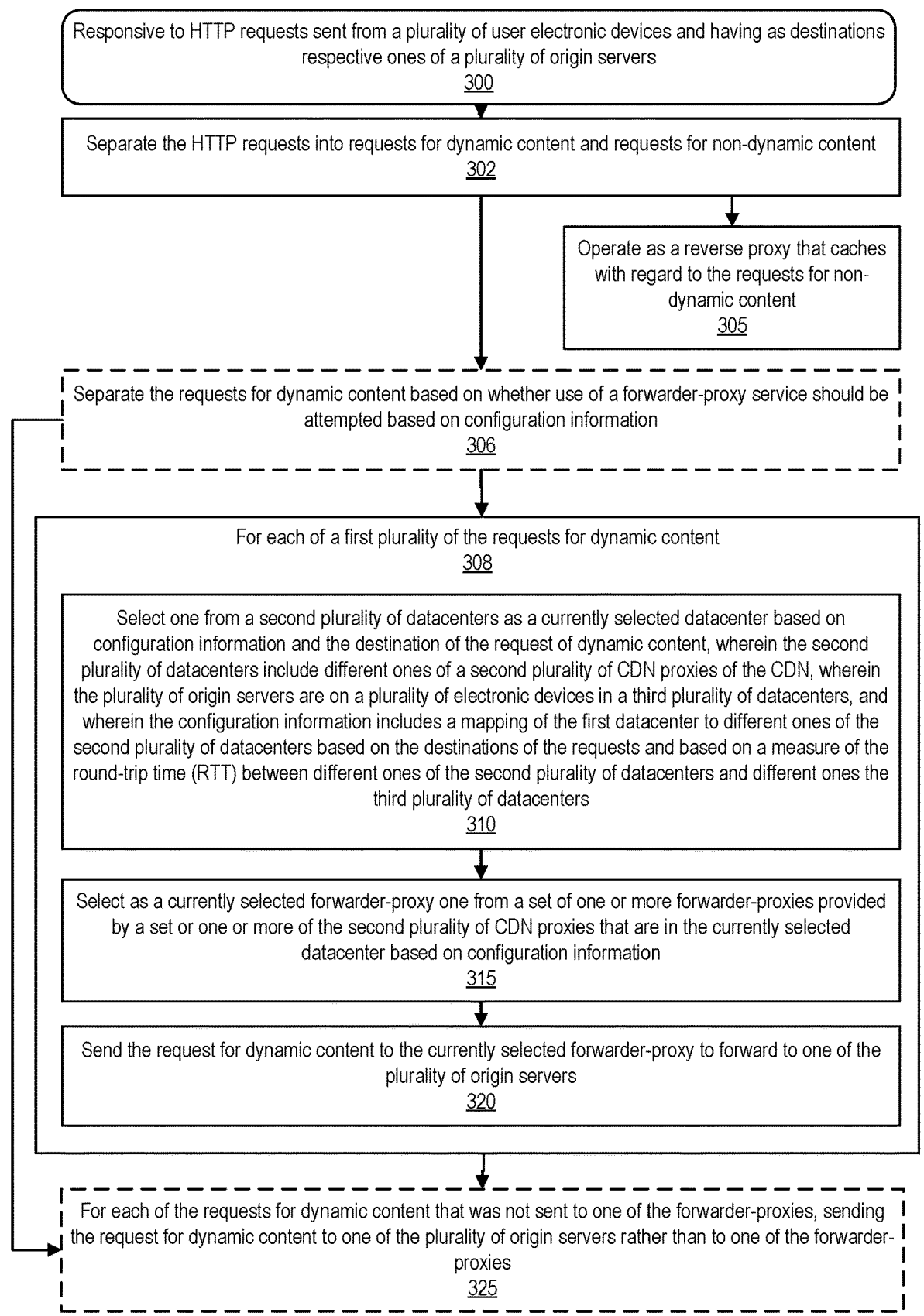
FIG. 3A is a flow diagram for a client-proxy according to some embodiments of the invention.

FIG. 3A is a flow diagram for a client-proxy according to some embodiments of the invention. Responsive to HTTP requests sent from a plurality of user electronic devices and having as destinations respective ones of a plurality of origin servers (block 300), in block 302 the HTTP requests are separated into requests for dynamic content and requests for non-dynamic content. Different embodiments may perform block 302 in different ways, including conventional ones used in conventional CDNs.

With regard to the requests for non-dynamic content, the client-proxy operates as a reverse proxy that caches in block 305. Different embodiments may perform block 305 in different ways, including conventional ones used in conventional CDNs.

With regard to the requests for dynamic content, in optional block 306 they are separated based on whether use of a forwarder-proxy service should be attempted based on configuration information. In embodiments that use configuration information, the configuration information is accessed to perform block 306. This block is optional because different embodiments may or may not support it. Embodiments that do support it, may do so for one or more different reasons; such as: 1) allowing for selective enabling of the forward-proxy service on a site, customer, and/or global basis; and/or 2) providing a mechanism to address a lack of configuration information due to a misconfiguration. For those of the requests for which use of the forwarder-proxy service is to be attempted, control passes to block 308. For the rest, control passes to optional block 325.

Block 308 include blocks 310, 315, and 320 that are performed for each of a first plurality of the requests for dynamic content. This may be all of them, or a subset of them depending on block 306.

In block 310, one from a second plurality of datacenters is selected as a currently selected datacenter based on configuration information and the destination of the request of dynamic content. The second plurality of datacenters includes different ones of a second plurality of CDN proxies of the CDN. The plurality of origin servers are on a plurality of electronic devices in a third plurality of datacenters. The configuration information includes a mapping of the first datacenter to different ones of the second plurality of datacenters based on the destinations of the requests and based on a measure of the round-trip time (RTT) between different ones of the second plurality of datacenters and different ones the third plurality of datacenters. In embodiments that use site configuration information, the site configuration information for the sites of the customers to which the requests are destined is accessed to determine which CDN datacenters to use for which of the request for dynamic content. By way of the above example with reference to FIG. 1, assuming that the user electronic devices 180S sends HTTP requests having as destinations the site of the customer 164V to the client-proxy 122P, the client-proxy 122P selects from the other CDN datacenters the datacenter 152R.

In block 315, a selection is performed to select, from a set of one or more forwarder-proxies provided by a set or one or more of the second plurality of CDN proxies that are in the currently selected datacenter, one as a currently selected forwarder-proxy based on configuration information. In embodiments that use global configuration information, the global configuration information is accessed to determine the forwarder-proxies that are in the currently selected datacenter. Some embodiments: 1) maintain status information that reflects the status of the set of forwarder-proxies; and 2) select one of the set of forwarder-proxies based on the status information (e.g., removing from consideration any of the forwarder-proxies that are down) and a load balancing algorithm (e.g., least pending request (e.g., how many requests it has sent to each of the forwarder-proxies, or how many requests have been sent, but for which a response has not been received, to each of the forwarder-proxies), hashing technique (e.g., based on the site ID); predefined or indicated in the global configuration information).

In block 320, the request for dynamic content is sent to the currently selected forwarder-proxy to forward to one of the plurality of origin servers. Continuing the above example that reference FIG. 1, the client-proxy 122P may send (based on load balancing) different ones the requests for dynamic content to different ones of the forwarder-proxies 124E and 124H, which may forward them to the origin servers 160Z (which may send HTTP responses back the same way).

From block 308, control passes to optional block 325.

In block 325, for each of the requests for dynamic content that was not sent to one of the forwarder-proxies, the request for dynamic content is sent to one of the plurality of origin servers rather than to one of the forwarder-proxies. Block 325 is optional because different embodiments may or may not support it. For instance, in embodiments that implement block 306 (from which control may pass to block 325), block 325 may be implemented for the different reasons expressed above with regard to block 306 (which may be determined before an attempt it made to use the forwarder-proxy server). In the case of control passing from block 308 to block 325, some embodiment implement block 325 as a fall back for those of the requests for which the forwarder-proxy service did not work (examples of which are discussed in more detail below).

Figure 3B:
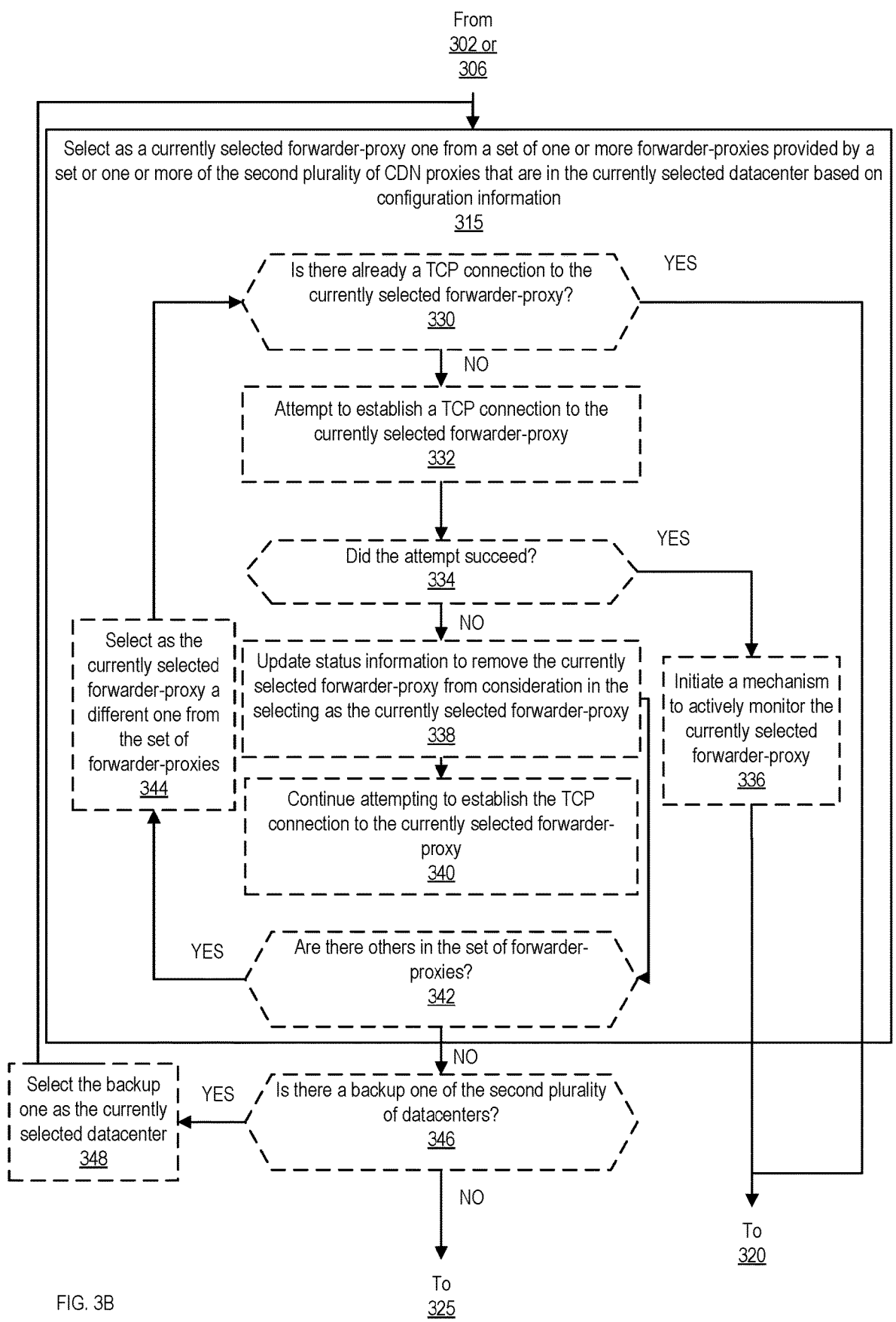
FIG. 3B is a more detailed flow diagram for a client-proxy according to some embodiments of the invention.

FIG. 3B is a more detailed flow diagram for a client-proxy according to some embodiments of the invention. Part of FIG. 3B is an exploded view of block 315 that include blocks 330-344. In block 330, is it determined if there is already a TCP connection to the currently selected forwarder-proxy. If so, control passes to bock 320; otherwise, to block 332. Continuing the above example that references FIG. 1, assuming the client-proxy 122P selected the forwarder-proxy 124E, the client-proxy 122P determines if there is already a TCP connection open from it to the forwarder-proxy 124E.

In block 336, a mechanism to actively monitor the currently selected forwarder-proxy is initiated. From block 336, control passes to block 320.

In block 332, an attempt is made to open a TCP connection to the currently selected forwarder-proxy. As shown in block 334, it is determined whether the attempt succeeds. If so, control passes to block 336; otherwise, to block 338.

In block 338, status information is updated to remove the currently selected forwarder-proxy from consideration in the selecting as the currently selected forwarder-proxy. From block 338, control passes to blocks 340 and 342.

In block 340, some embodiments continue attempting to establish the TCP connection to the currently selected forwarder-proxy. If and when the TCP connect is established, the status information is updated to include the currently selected forwarder-proxy back for consideration.

In block 342, it is determined if there are others in the set of forwarder-proxies to try. If so, control passes to block 344; otherwise control passes out of block 315 (to block 346 or block 325 depending on whether block 346 is implemented).

In block 344, a different one from the set of forwarder-proxies is selected as the currently selected forwarder-proxy and control passes back to block 330. Continuing the above example that references FIG. 1, the client-proxy 122P selects the forwarder-proxy 124H.

In block 346, it is determined if there is a backup one of the second plurality of datacenters. If not, control passes to block 325. If so, control passes to block 348 where the backup one is selected as the currently selected datacenter; control then passes to block 315.

Figure 3C:
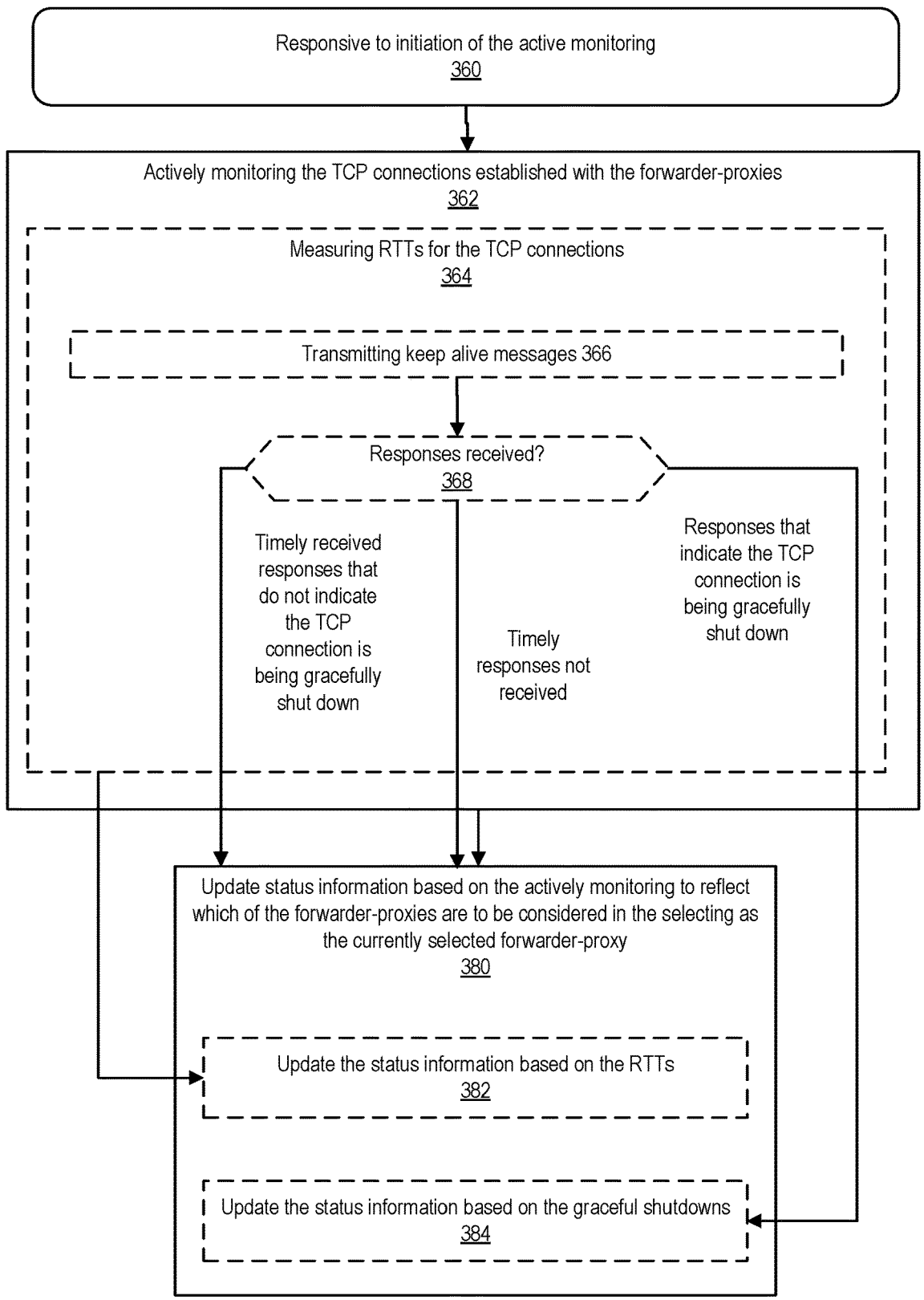
FIG. 3C is a more detailed flow diagram for a client-proxy performing active monitoring according to some embodiments of the invention.

FIG. 3C is a more detailed flow diagram for a client-proxy performing active monitoring according to some embodiments of the invention. Responsive to the initiation of active monitoring (block 360), the client-proxy begins to actively monitor the TCP connections with the forwarder-proxies (block 362). In addition, the status information is updated based on the active monitoring to reflect which of the forwarder-proxies are to be considered in the selecting as the currently selected forwarder-proxy (block 380). In some embodiments, the status information my indicate, for each of the TCP connections to the set of forwarder-proxies, whether it is up or down. With reference to FIG. 3B, each time a TCP connection is successfully opened, in block 336 the active monitoring is initiated for that TCP connection.

Different embodiments may implement blocks 362 and 380 in different ways. In some embodiments, block 362 includes measuring the RTTs for the TCP connections (block 364), while block 382 includes updating the status information based on the measured RTTs. For instance, if the performance over a given TCP connection to a given forwarder-proxy fails to meet a threshold based on the measuring the RTT, it may be marked as down in the status information.

In some embodiments, block 362 includes transmitting keep alive messages (block 366) and reacting based on the responses received (block 368). While in some embodiments these keep alive messages and responses are used to measure the RTT in block 364, other embodiments use a different mechanism for block 364 and/or perform blocks 366/368 without performing block 364. In block 368, some embodiments distinguish between: 1) timely receipt of responses; and 2) lack of timely receipt of responses (which includes when responses are not received). Some embodiments, in block 368, also distinguish between: 1) responses that indicate that the TCP connection is to be gracefully shutdown; and 2) those that do not. More specifically, a forwarder-proxy may respond to a keep alive message with prearranged information that indicates that the TCP connection to the forwarder-proxy (and perhaps the forwarder-proxy) is going to be shut down. If it does, control passes to block 384 where the status information is updated based on the planned shutdown of the TCP connection/forwarder-proxy.

Processing Requests for Dynamic Content by a Forwarder-Proxy

FIG. 4A is a flow diagram for a forwarder-proxy according to some embodiments of the invention. Block 400 includes blocks 402, 404, and 406 that are performed for each of a plurality of the requests for dynamic content sent from different client-proxies in different ones of a first plurality of CDN proxies of the CDN responsive to different ones the HTTP requests sent from different ones of the plurality of user electronic devices to the different client-proxies.

In block 402, one of a third plurality of datacenters is selected as a currently selected datacenter based on the destination of the request for dynamic content, where different ones of the plurality of origin servers are executing on electronic devices in different ones of the third plurality of datacenters. In embodiments that use site configuration information, the site configuration information for the sites of the customers to which the requests are destined is accessed to determine which customer datacenters to use for which of the request for dynamic content. By way of the above example with reference to FIG. 1, assuming that the user electronic device 180S sends HTTP requests, which have as destinations the sites of the customers 164A and 164V, to the forwarder-proxy 124E in the client-proxy 122P, the forwarder-proxy 124E respectively selects the datacenters 154F and 152R.

In block 404, the forwarder-proxy selects as a currently selected origin server one from a set of one or more origin servers in the currently selected datacenter based on configuration information. In embodiments that use site configuration information, the site configuration information is accessed to determine the origin servers that are in the currently selected datacenter. Some embodiments: 1) maintain status information that reflects the status of the set of origin servers; and 2) select one of the set of origin servers based on the status information (e.g., removing from consideration any of the origin servers that are down) and a load balancing algorithm (e.g., least pending request (e.g., how many requests it has sent to each of the origin servers, or how many requests have been sent, but for which a response has not been received, to each of the origin servers), hashing technique (e.g., based on the site ID); predefined or indicated in the site configuration information). As discussed in more detail later herein, the status information may be maintained in some embodiments based on passive monitoring and/or active monitoring.

In block 406, the request for dynamic content is sent to the currently selected origin server. Continuing the above example that references FIG. 1, the forwarder-proxy 124E may send (based on load balancing) different ones the requests for dynamic content to different ones of the origin server(s) 160T and 160Z (which may send HTTP responses back the same way).

Figure 4B:
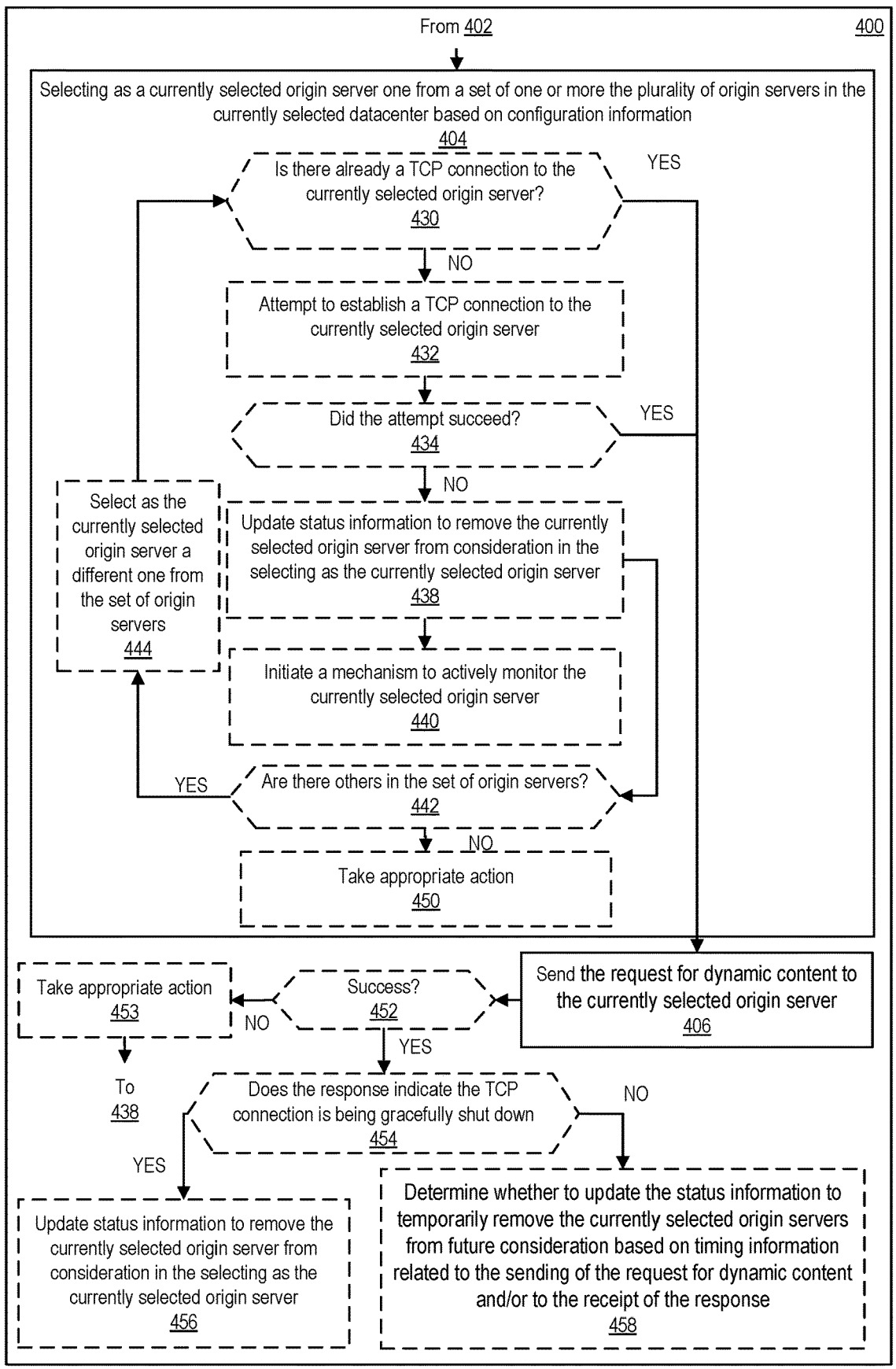
FIG. 4B is a more detailed flow diagram for a forwarder-proxy according to some embodiments of the invention.

FIG. 4B is a more detailed flow diagram for a forwarder-proxy according to some embodiments of the invention. FIG. 4B is an exploded view of block 400, includes an exploded view of block 404 that includes blocks 430-450. In block 430, is it determined if there is already a TCP connection to the currently selected origin server. If so, control passes to block 406; otherwise, to block 432. Continuing the above example that references FIG. 1, assuming the client-proxy 122P selected the forwarder-proxy 124E, the forwarder-proxy 124E determines if there is already a TCP connection open from it to the currently selected origin server in the currently selection customer datacenter.

In block 432, an attempt is made to open a TCP connection to the currently selected origin server. As shown in block 434, it is determined whether the attempt succeeds. If so, control passes to block 406; otherwise, to block 438. As previously described, in some embodiments, the forwarder-proxy in block 432 attempts to establish additional TCP connections to the currently selected origin server, but without sending a request on those TCP connections. These TCP connections remain valid connections, and they are used when needed. As a result, when such a TCP connection is needed (see block 430), one from the pool can be used rather than incurring the delay to establish one from scratch.

In block 438, status information is updated to remove the currently selected origin server from consideration in the selecting as the currently selected origin server. From block 438, control passes to blocks 440 and 442.

In block 440, a mechanism to actively monitor the currently selected origin server is initiated.

In block 442, it is determined if there are other in the set of origin servers to try. If so, control passes to block 444; otherwise control passes block 450.

In block 444, a different one from the set of origin servers is selected as the currently selected origin server and control passes back to block 430. Continuing the above example that references FIG. 1, the forwarder-proxy 124E selects another one of the origin servers in the currently selected customer datacenter.

In block 450, appropriate action is taken. Different embodiments may perform block 450 differently. For example, embodiments of a forwarder-proxy may: 1) send an alert to the operator(s) of the CDN and/or the customer; 2) pick a backup customer datacenter if there is one and attempt to select an origin server in that backup datacenter; and/or 3) fail the request to the client-proxy, which may broadcast to all client-proxies to stop using this forwarder-proxy for this site for an amount of time (e.g., the forwarder-proxy may use a real time sync service to tell the client-proxy to tell all client-proxies to stop using this forwarder-proxy with this site). While some embodiments may determine that there is a failure to the origin server on a single occurrence, other embodiments may require a threshold number of failures on retries of the same request and/or require a threshold number of failures of different requests before determining there is a failure to the origin server.

From block 406, control passes to optional block 452.

In optional block 452, it is determined if the response to the request sent in block 406 is successful. If successful, control passes to block 454; otherwise appropriate action is taken in block 453. For example, embodiments may measure success based on the forwarder-proxy being unable to send a request to the origin server (e.g., due to a TCP base failure) and/or lack of timely receipt of a response. Different embodiments may perform block 453 differently. For example, embodiments of a forwarder-proxy may send an alert to the operator(s) of the CDN and/or the customer. In certain embodiments, from block 453, control passes to block 438 to remove that origin server from future consideration, to initiate the mechanism to actively monitor that origin server, and to pick another origin server or take appropriate action (blocks 442, 444, and 450).

In block 454, some embodiments determine whether the response indicates that the TCP connection to the origin server is to be gracefully shutdown (in similar manner to the above discussed graceful shutdown). If so, control passes to block 456, where the status information is updated to remove the currently selected origin server from consideration in the selecting as the currently selected origin server. Otherwise, control passes to block 458.

In block 458, it is determined whether to update the status information to temporarily remove the currently selected origin server from future consideration based on timing information related to the sending of the request for dynamic content and/or to the receipt of the response. As compared to the active monitoring (which, for example, can use keep alive messages), block 458 is a form of passive monitoring in that it relies on actual requests for dynamic content; and it is monitoring for degradation. Put another way, block 458 determines whether performance of a given one of the origin servers is currently insufficient.

Figure 4C:
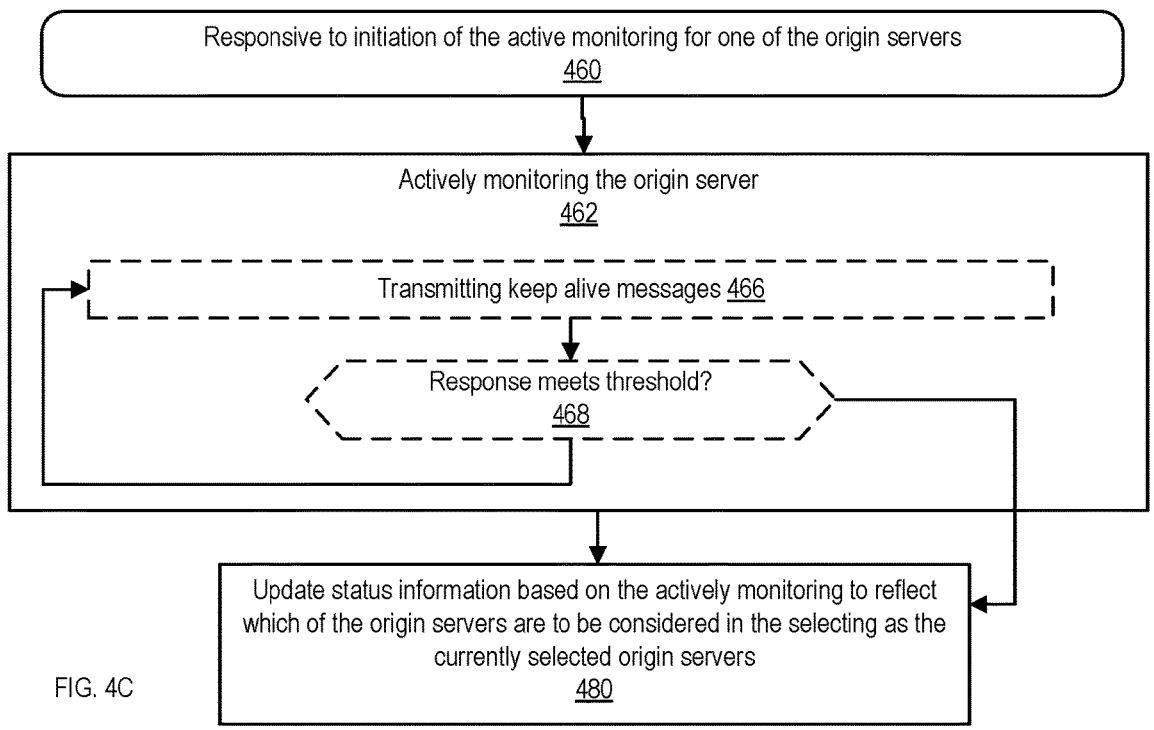
FIG. 4C is a more detailed flow diagram for a forwarder-proxy performing active monitoring according to some embodiments of the invention.

FIG. 4C is a more detailed flow diagram for a forwarder-proxy performing active monitoring according to some embodiments of the invention. Responsive to the initiation of active monitoring for one of the origin server(s) (block 460), the forwarder-proxy begins to actively monitor the origin server(s) (block 462). With reference to FIG. 4B, when an origin server is removed from consideration (other than because of a graceful shutdown), in block 440 the active monitoring is initiated for that origin server.

In block 480, the status information is updated based on the active monitoring to reflect which of the origin servers are to be considered in the selecting as the currently origin server (block 480). In some embodiments, the active monitoring is performed for a given origin server until that origin server is added for consideration.

For instance, in some embodiments block 462 includes: 1) transmitting keep alive messages to the origin server(s) being actively monitored (block 466); and 2) determining if response(s) to the keep alive messages for a given one of the origin servers meets a threshold (block 468) reflecting that that origin server may be considered again (at which point, control passes to block 480).

CONCLUSION

As described above, some embodiments use active monitoring for connections between client-proxies and forwarder-proxies, but a combination of active and passive monitoring for connections between forwarder-proxies and origin servers. While this additional network traffic is acceptable on the connections within the CDN (between the client-proxies and forwarder-proxies), it is not acceptable (in some situations) between forwarder-proxies and origin servers when there are real requests and responses being sent between them. Thus, in some embodiments, for connections between forwarder-proxies and origin servers: 1) active monitoring is used for a given origin server while that origin server has been removed from consideration; and 2) passive monitoring is used for a given origin server while that origin server is included for consideration (and thus, may be receiving real requests and sending responses).

Additionally or alternatively, in some embodiments, assuming there are multiple forwarder-proxies with connections to a given origin server, one of the forwarder-proxies is elected to perform the active monitoring and inform the other forwarder-proxies when the origin server is considered back up for consideration again. This approach reduces the resources expended when actively monitoring a given origin server.

Some embodiments monitor the connections between client-proxies and forwarder-proxies for layer 3/layer 4 quality. For example, some embodiments establish a mesh of tunnels between CDN datacenters. Assume a client-proxy in a datacenter in Hong Kong would like to connect to a forwarder-proxy in a datacenter in New York. In addition, assume that this TCP connection can be run on: 1) a tunnel between Hong Kong and New York; OR 2) a tunnel between Hong Kong and Frankfurt connected to a tunnel between Frankfurt and New York. Some embodiments will make this decision based on the expected layer 3/layer 4 quality. Additionally or alternatively, since each CDN datacenter will have multiple operators and the operators of at least some of the CDN datacenters will overlap, if requests, to be sent from a given client-proxy in one CDN datacenter to a given forwarder-proxy in another CDN datacenter, are to be routed through an intermediary CDN datacenter (of which there is two or more to choose from), then some embodiments attempt to use an intermediary CDN datacenter that has a common operator with the CDN datacenter hosting the forwarder-proxy. Thus, these client-proxy to forwarder-proxy TCP connections are an internal, managed, preferred connection inside the CDN network.

Exemplary Electronic Device

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

Figure 5:
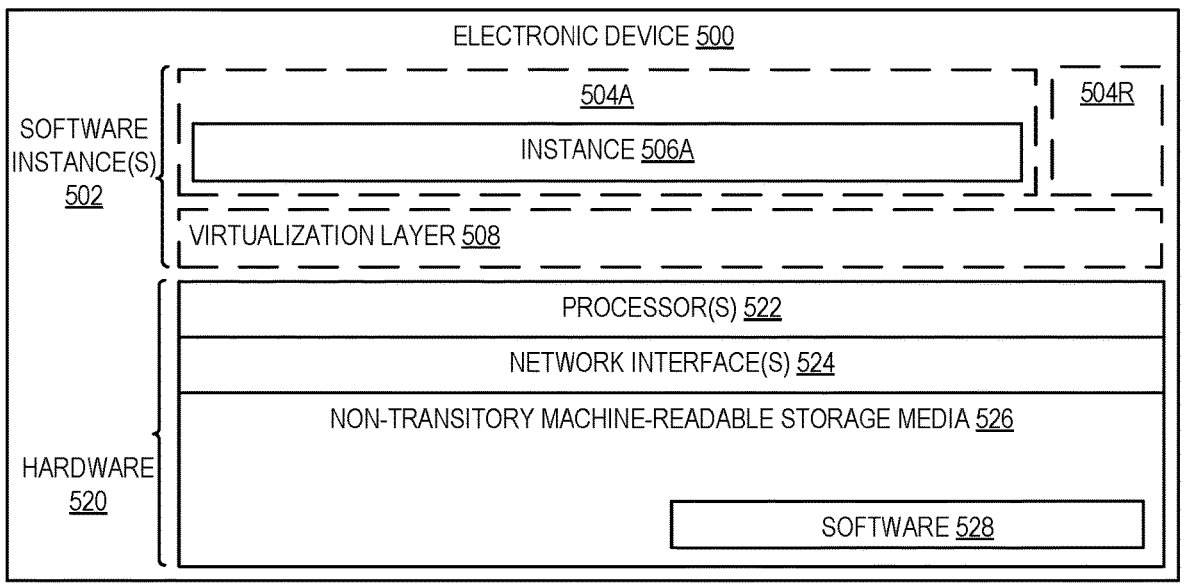
FIG. 5 is a block diagram illustrating an electronic device according to some embodiments of the invention.

FIG. 5 is a block diagram illustrating an electronic device according to some embodiments of the invention. FIG. 5 shows hardware 520 comprising a set of one or more processor(s) 522, a set of one or more network interfaces 524 (wireless and/or wired), and non-transitory machine-readable storage media 526 having stored therein software 528 (which includes instructions executable by the set of one or more processor(s) 522). Software 528 can include code, which when executed by hardware 520, causes the electronic device 500 to perform operations of one or more embodiments described herein. Each of the datacenters 150A-P, 152A-R, and 154A-K may include multiple electronic devices. Each of the management server(s) 144, CDN proxies, and origin servers may be implemented in software on electronic devices in these datacenters. Thus, depending on whether the electronic device 500 is operating as a user electronic device 180, an electronic device in a CDN datacenter, or an electronic device in a customer datacenter, the software 528 respectively represents code that when executed implements a client, CDN proxy, or origin server. Similarly, in the case of a management server 144, the software 528 represents code that, when executed by an electronic device, implements a management server.

In electronic devices that use compute virtualization, the set of one or more processor(s) 522 typically execute software to instantiate a virtualization layer 508 and software container(s) 504A-R (e.g., with operating system-level virtualization, the virtualization layer 508 represents the kernel of an operating system (or a shim executing on a base operating system) that allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 528 (illustrated as instance 506A) is executed within the software container 504A on the virtualization layer 508. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

ALTERNATIVE EMBODIMENTS

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed in a content delivery network (CDN) that responsive to hypertext transfer protocol (HTTP) requests sent from a plurality of user electronic devices and having as destinations respective ones of a plurality of origin servers, accelerates delivery of content originating from the plurality of origin servers on behalf of customers of the CDN, the method comprising:
    separating, by a first plurality of CDN proxies implemented by a first plurality of electronic devices located in a first plurality of datacenters, the HTTP requests into requests for dynamic content and requests for non-dynamic content, wherein the first plurality of CDN proxies operate as reverse proxies that cache with regard to the requests for non-dynamic content;
    sending, by the first plurality of CDN proxies, different ones of a first plurality of the requests for dynamic content to different ones of a second plurality of CDN proxies implemented by a second plurality of electronic devices located in a second plurality of datacenters based on the destinations of the requests and according to a mapping between the second plurality of datacenters and a third plurality of datacenters for different ones of the customers based on a measure of a round-trip time (RTT) between different ones of the second plurality of datacenters and different ones of the third plurality of datacenters; and
    sending, by the second plurality of CDN proxies, the requests for dynamic content to different ones of the plurality of origin servers based on configuration information, wherein the plurality of origin servers are implemented by a third plurality of electronic devices located in the third plurality of datacenters.

2. The method of claim 1, further comprising:
    sending, by the first plurality of CDN proxies, different ones of a second plurality of the requests for dynamic content directly to different ones of the plurality of origin servers based on the destinations of the HTTP requests.

3. The method of claim 1, wherein at least one of the second plurality of electronic devices located in each of the second plurality of datacenters measures the RTT to the third plurality of datacenters.

4. The method of claim 1, wherein the measure of the RTT between different ones of the second plurality of datacenters and different ones the third plurality of datacenters is based on a measure of a time required to open a transmission control protocol (TCP) connection.

5. The method of claim 1, wherein the mapping is established by a management server.

6. The method of claim 5, wherein the management server causes at least one of the second plurality of electronic devices located in each of the second plurality of datacenters to measure the RTT to at least one of the third plurality of datacenters, generates the mapping based on the measures of the RTTs, and causes the mapping to be stored in the first plurality of CDN proxies and the second plurality of CDN proxies.

7. The method of claim 1, wherein configuration information stored in each of the first plurality of CDN proxies identifies each of the second plurality of datacenters and each of the second plurality of CDN proxies in those second plurality of datacenters.

8. The method of claim 1, wherein at least one of the second plurality of datacenters includes at least two of the second plurality of CDN proxies, and wherein at least one of the first plurality of CDN proxies applies load balancing to select between the at least two of the second plurality of CDN proxies to send different ones of the requests for dynamic content.

9. The method of claim 8, wherein the at least one of the first plurality of CDN proxies actively monitors a status of a TCP connection with each of the at least two of the plurality of CDN proxies, and wherein the at least one of the first plurality of CDN proxies takes into account the status of the TCP connections when applying the load balancing.

10. The method of claim 1, wherein at least one of the second plurality of CDN proxies actively monitors a status after it fails to establish a TCP connection with one of the plurality of origin servers.

11. The method of claim 1, wherein at least one of the third plurality of datacenters includes at least two of the plurality of origin servers, and wherein at least one of the second plurality of CDN proxies applies load balancing to select between the at least two of the plurality of origin servers to send different ones of the requests for dynamic content.

12. The method of claim 11, wherein the at least one of the second plurality of CDN proxies passively monitors a status based on whether the different ones of the requests for dynamic content that it sends result in receipt of HTTP responses, and wherein the at least one of the second plurality of CDN proxies takes into account the status when applying the load balancing.

13. The method of claim 12, wherein the at least one of the second plurality of CDN proxies actively monitors a status of a TCP connection with each of the at least two of the plurality of origin servers only when that TCP connection is considered down responsive to the passive monitoring.

14. The method of claim 1, wherein the first plurality of CDN proxies sends the first plurality of the requests for dynamic content to different ones of the second plurality of CDN proxies also based on configuration information that identifies each of the second plurality of datacenters and each of the second plurality of CDN proxies in those second plurality of datacenters.

15. The method of claim 1, wherein TCP connections between the first plurality of CDN proxies and the second plurality of CDN proxies are configured as preferred connections inside of the CDN.

16. The method of claim 1, wherein at least one of the first plurality of CDN proxies establishes a transmission control protocol (TCP) connection with one of the second plurality of CDN proxies and keeps the TCP connection open to use the TCP connection to send requests for dynamic content from more than one of the plurality of user electronic devices to the one of the second plurality of CDN proxies.

17. A method performed by a first CDN proxy implemented by one or more electronic devices located in a first datacenter to perform client-proxy type operations in a CDN network that, responsive to hypertext transfer protocol (HTTP) requests sent from a plurality of user electronic devices and having as destinations respective ones of a plurality of origin servers, accelerates delivery of content originating from the plurality of origin servers on behalf of customers of the CDN, the method comprising:
  separating the HTTP requests into requests for dynamic content and requests for non-dynamic content;
  operating as a reverse proxy that caches with regard to the requests for non-dynamic content;
  for each of a first plurality of the requests for dynamic content, performing the following:
    selecting one from a second plurality of datacenters as a currently selected datacenter based on configuration information and the destination of the request for dynamic content, wherein the second plurality of datacenters includes different ones of a second plurality of CDN proxies of the CDN, wherein the plurality of origin servers are implemented by a plurality of electronic devices located in a third plurality of datacenters, and wherein the configuration information includes a mapping of the first datacenter to different ones of the second plurality of datacenters based on the destinations of the requests and based on a measure of a round-trip time (RTT) between different ones of the second plurality of datacenters and different ones the third plurality of datacenters,
    selecting as a currently selected CDN proxy one from a set of one or more of the second plurality of CDN proxies that are in the currently selected datacenter based on configuration information, and
    sending the request for dynamic content to the currently selected CDN proxy to send to one of the plurality of origin servers; and
  for each of the requests for dynamic content that was not sent to one of the second plurality of CDN proxies, sending the request for dynamic content to one of the plurality of origin servers rather than to one of the second plurality of CDN proxies.

18. The method of claim 17, wherein the first CDN proxy establishes a transmission control protocol (TCP) connection with the currently selected CDN proxy and keeps the TCP connection open to use the TCP connection to send requests for dynamic content from more than one of the plurality of user electronic devices to the currently selected CDN proxy.

19. A method performed by a second CDN proxy implemented by one or more electronic devices located in a second datacenter to perform forwarder-proxy type operations in a CDN network that, responsive to hypertext transfer protocol (HTTP) requests sent from a plurality of user electronic devices and having as destinations respective ones of a plurality of origin servers, accelerates delivery of content originating from the plurality of origin servers on behalf of customers of the CDN, the method comprising:
  for each of a plurality of the requests for dynamic content sent from different ones of a first plurality of CDN proxies of the CDN in a first plurality of datacenters responsive to different ones of the HTTP requests sent from different ones of the plurality of user electronic devices to the different ones of the first plurality of CDN proxies, performing the following:
- selecting one of a third plurality of datacenters as a currently selected datacenter based on the destination of the request for dynamic content, wherein different ones of the plurality of origin servers are implemented by electronic devices located in different ones of the third plurality of datacenters,
- selecting as a currently selected origin server one from a set of one or more of the plurality of origin servers in the currently selected datacenter based on configuration information, and
- sending the request for dynamic content to the currently selected origin server.

20. The method of claim 19, wherein at least one of the first plurality of CDN proxies establishes a transmission control protocol (TCP) connection with the second CDN proxy and keeps the TCP connection open to use the TCP connection to send requests for dynamic content from more than one of the plurality of user electronic devices to the second CDN proxy.

* * * * *